(No Model.) 14 Sheets—Sheet 1.

J. HYSLOP.
MACHINE FOR MAKING LEATHER BOARD BOOT OR SHOE SHANKS, &c.

No. 591,353. Patented Oct. 5, 1897.

WITNESSES.

INVENTOR.
John Hyslop (No Model.)  14 Sheets—Sheet 2.

J. HYSLOP.
MACHINE FOR MAKING LEATHER BOARD BOOT OR SHOE SHANKS, &c.

No. 591,353. Patented Oct. 5, 1897.

WITNESSES.
INVENTOR.
John Hyslop.

(No Model.)  14 Sheets—Sheet 3.
J. HYSLOP.
MACHINE FOR MAKING LEATHER BOARD BOOT OR SHOE SHANKS, &c.
No. 591,353.  Patented Oct. 5, 1897.
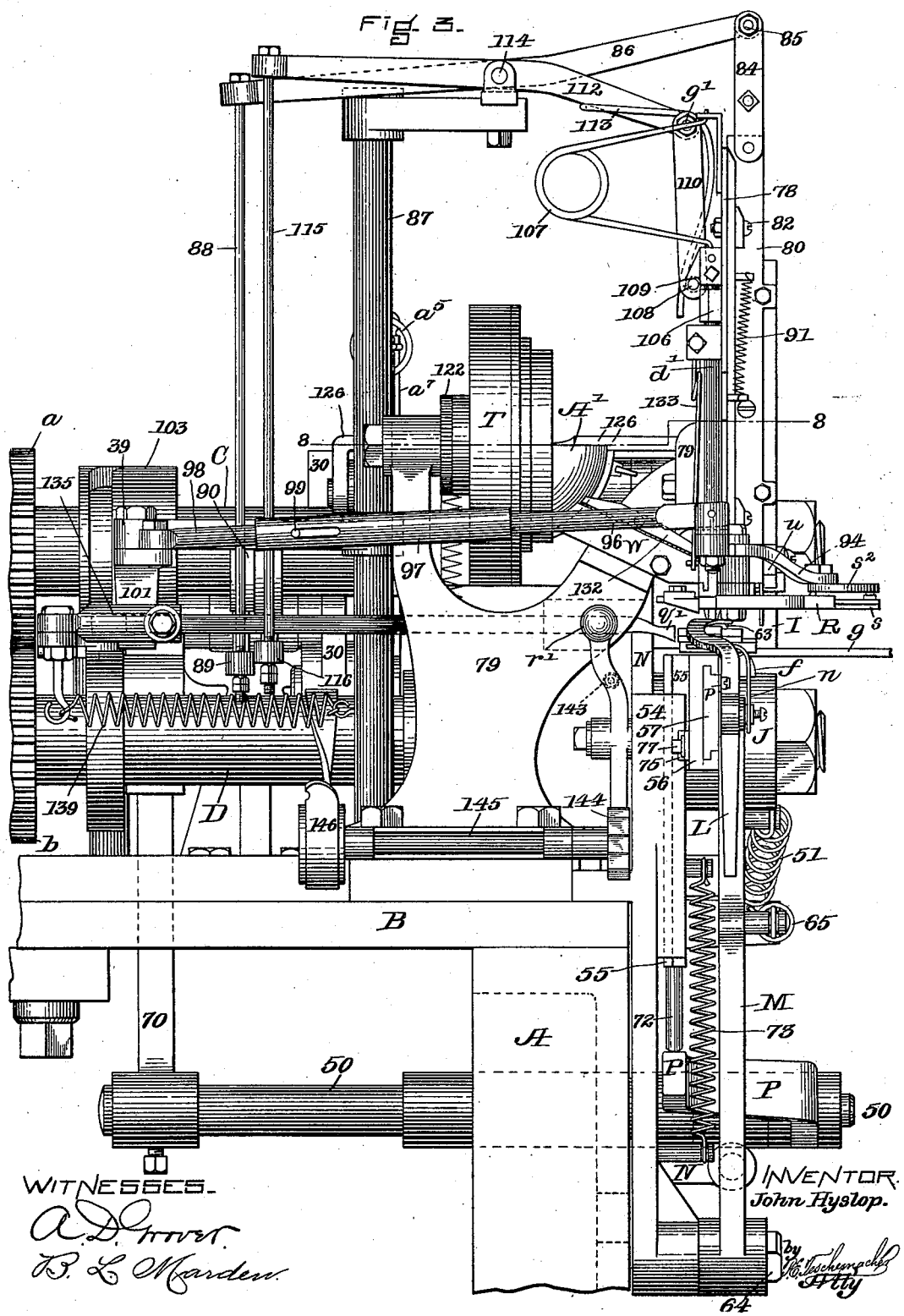
WITNESSES
INVENTOR
John Hyslop.

(No Model.) 14 Sheets—Sheet 4.
J. HYSLOP.
MACHINE FOR MAKING LEATHER BOARD BOOT OR SHOE SHANKS, &c.
No. 591,353. Patented Oct. 5, 1897.
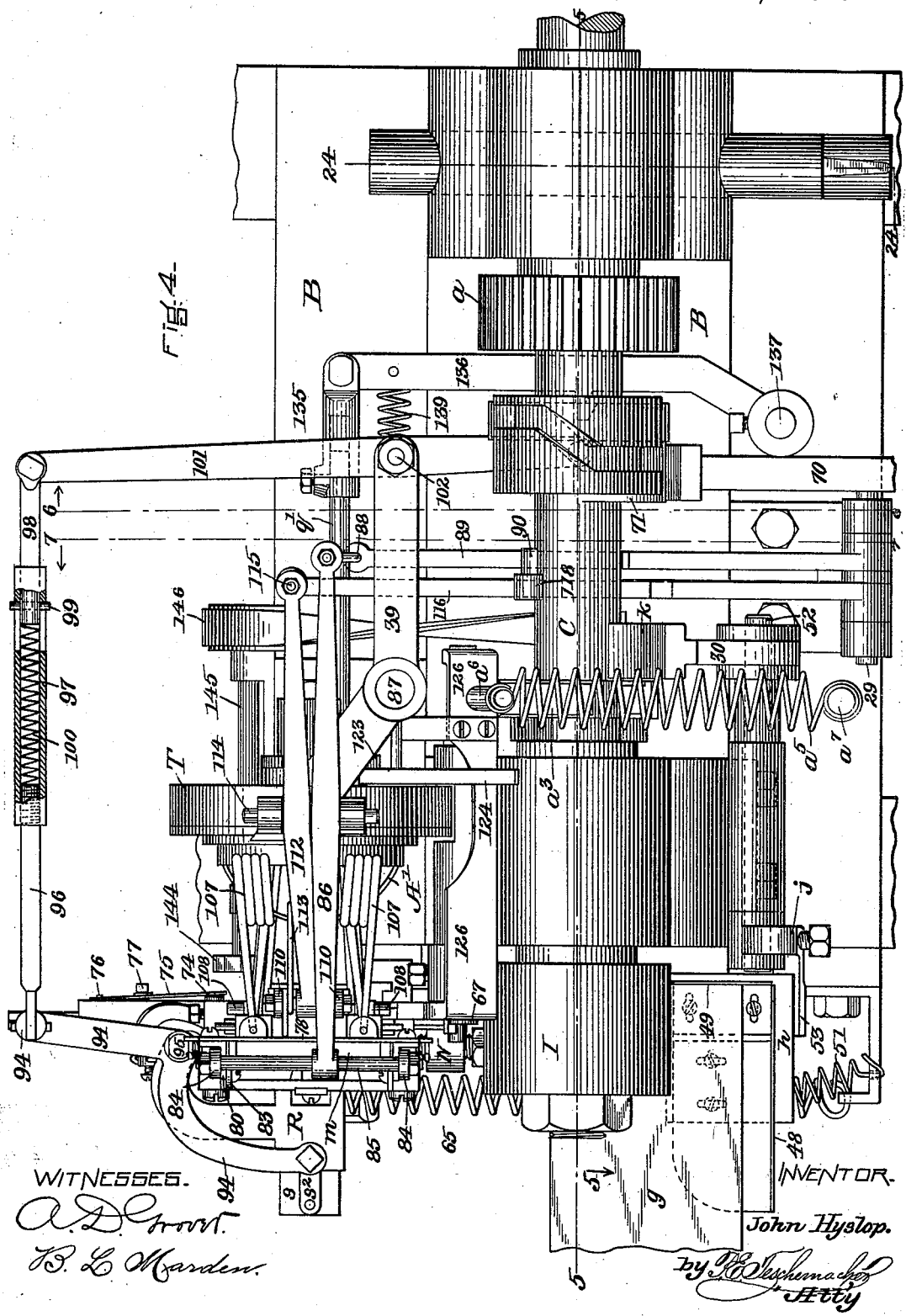
WITNESSES.
A. D. Grover.
B. L. Marden.
INVENTOR.
John Hyslop.
by Tuschmacher
Atty (No Model.) 14 Sheets—Sheet 5.
J. HYSLOP.
MACHINE FOR MAKING LEATHER BOARD BOOT OR SHOE SHANKS, &c.
No. 591,353. Patented Oct. 5, 1897.
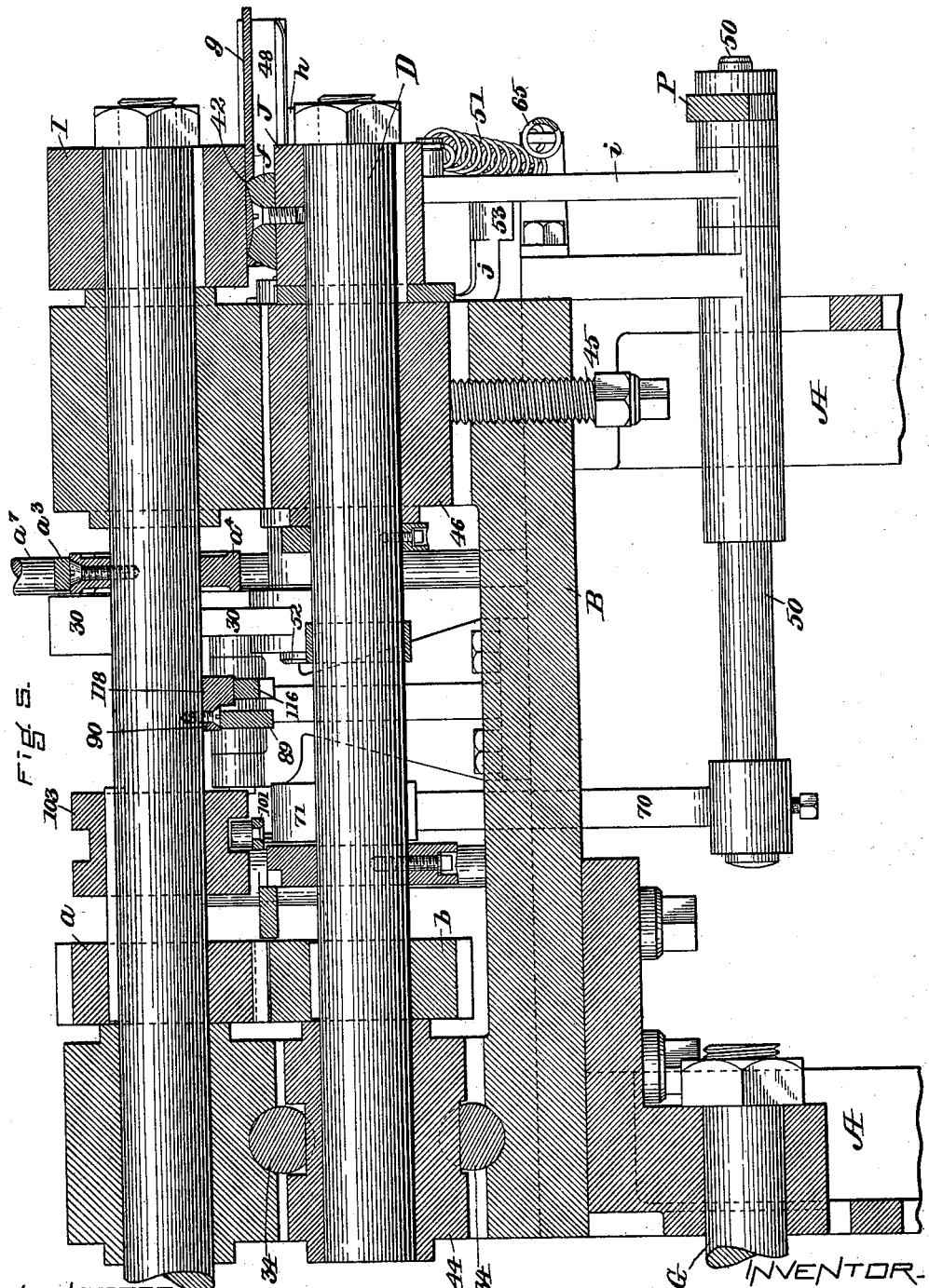
WITNESSES.
INVENTOR.
John Hyslop.

(No Model.) 14 Sheets—Sheet 6.
J. HYSLOP.
MACHINE FOR MAKING LEATHER BOARD BOOT OR SHOE SHANKS, &c.
No. 591,353. Patented Oct. 5, 1897.
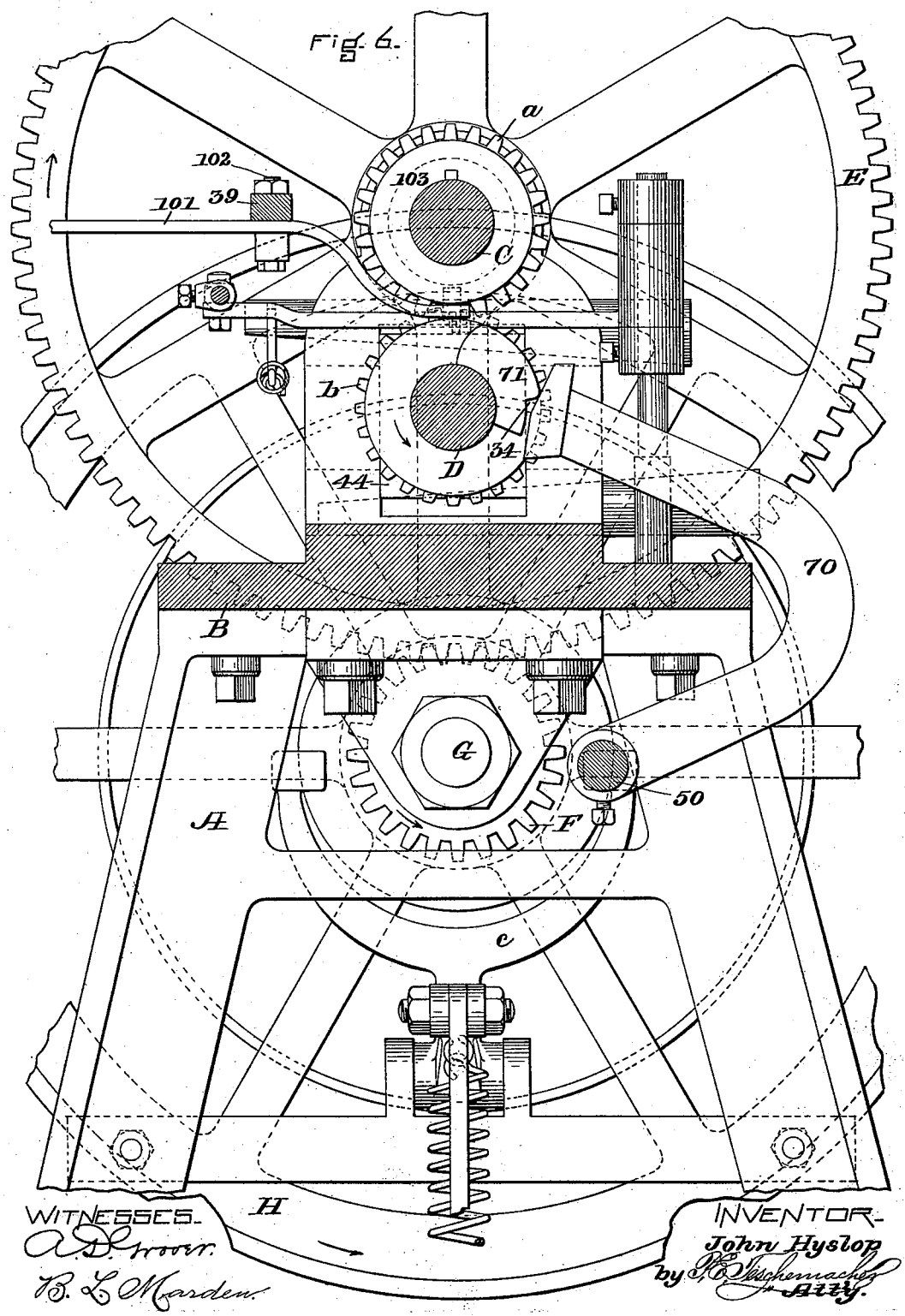

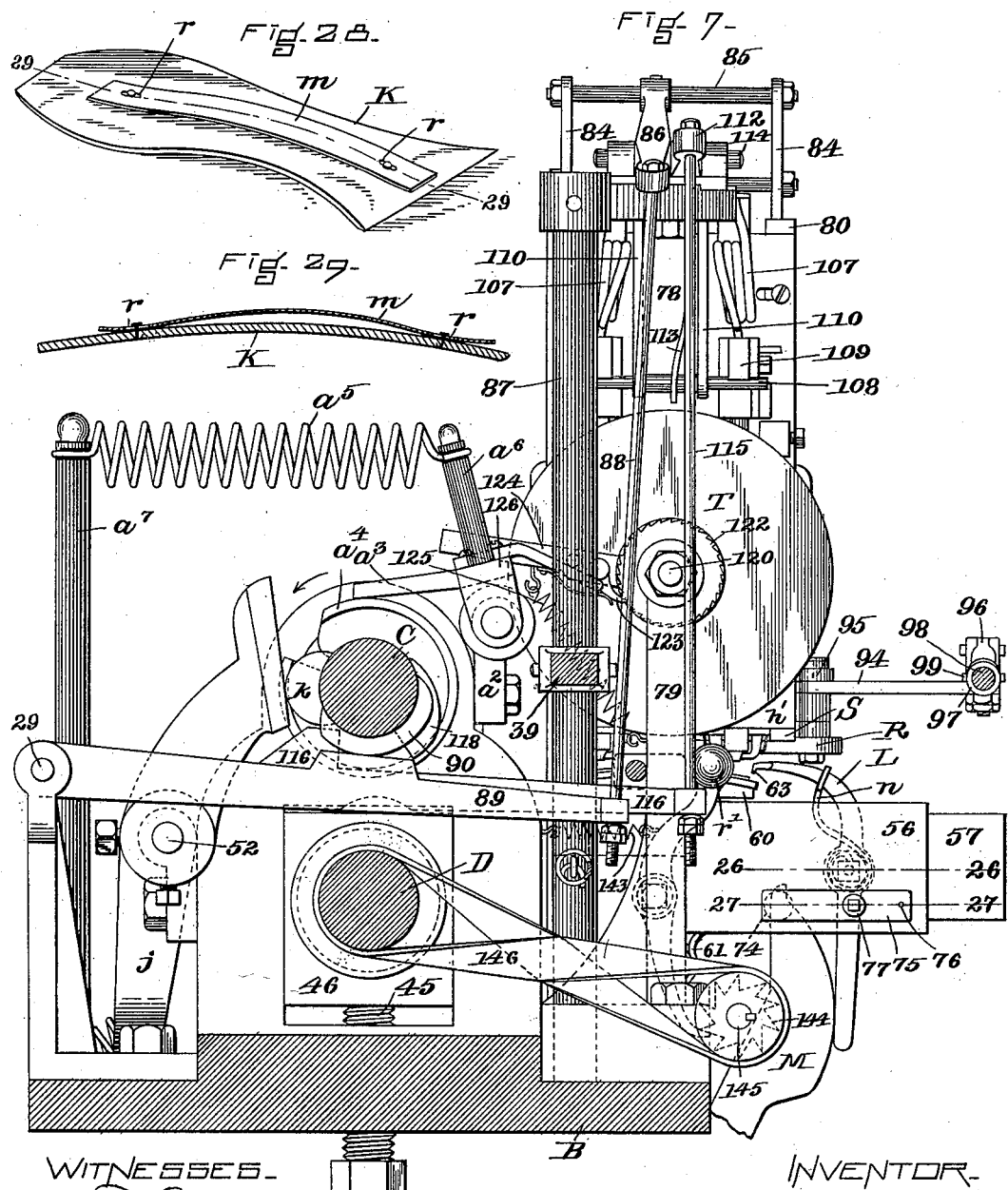

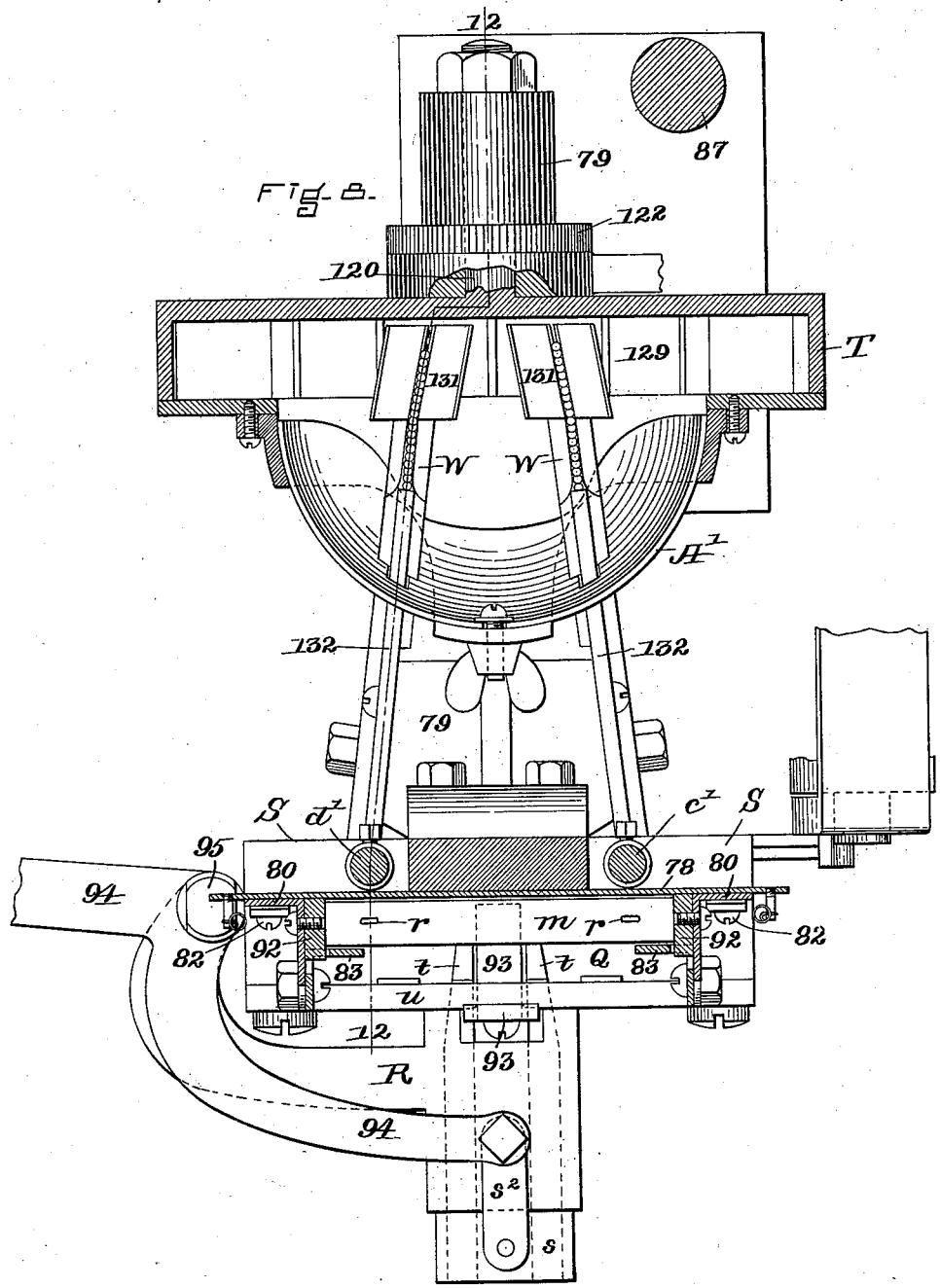

(No Model.) 14 Sheets—Sheet 9.
J. HYSLOP.
MACHINE FOR MAKING LEATHER BOARD BOOT OR SHOE SHANKS, &c.
No. 591,353. Patented Oct. 5, 1897.
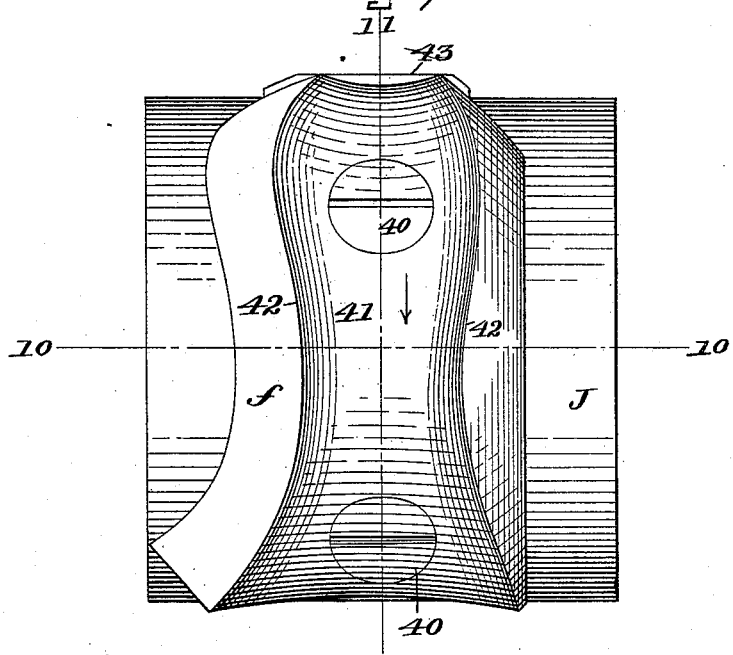
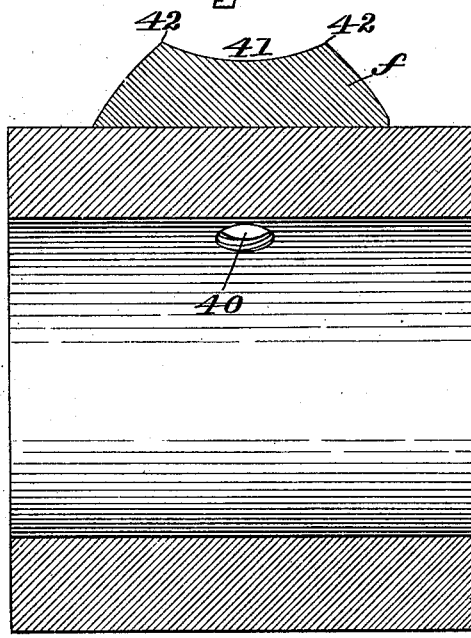
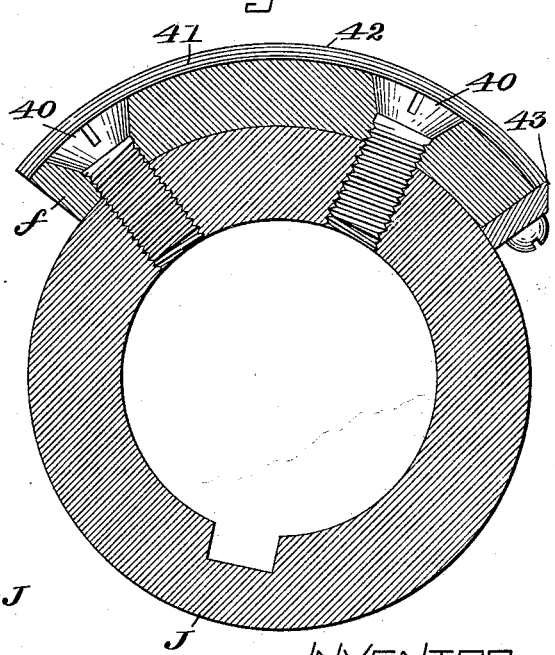
WITNESSES.
A. D. Grover.
B. L. Marden.
INVENTOR.
John Hyslop
by Teschemacher
Att'y.

(No Model.)  
14 Sheets—Sheet 10.
J. HYSLOP.
MACHINE FOR MAKING LEATHER BOARD BOOT OR SHOE SHANKS. &c.
No. 591,353. Patented Oct. 5, 1897.
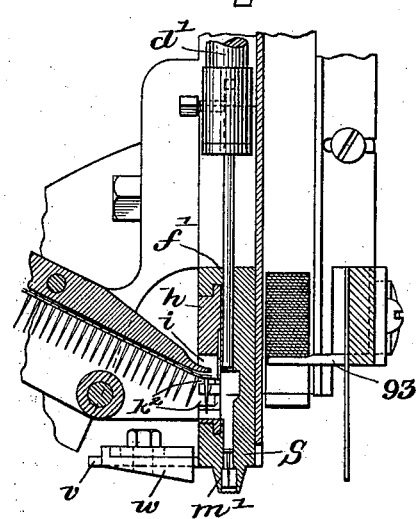
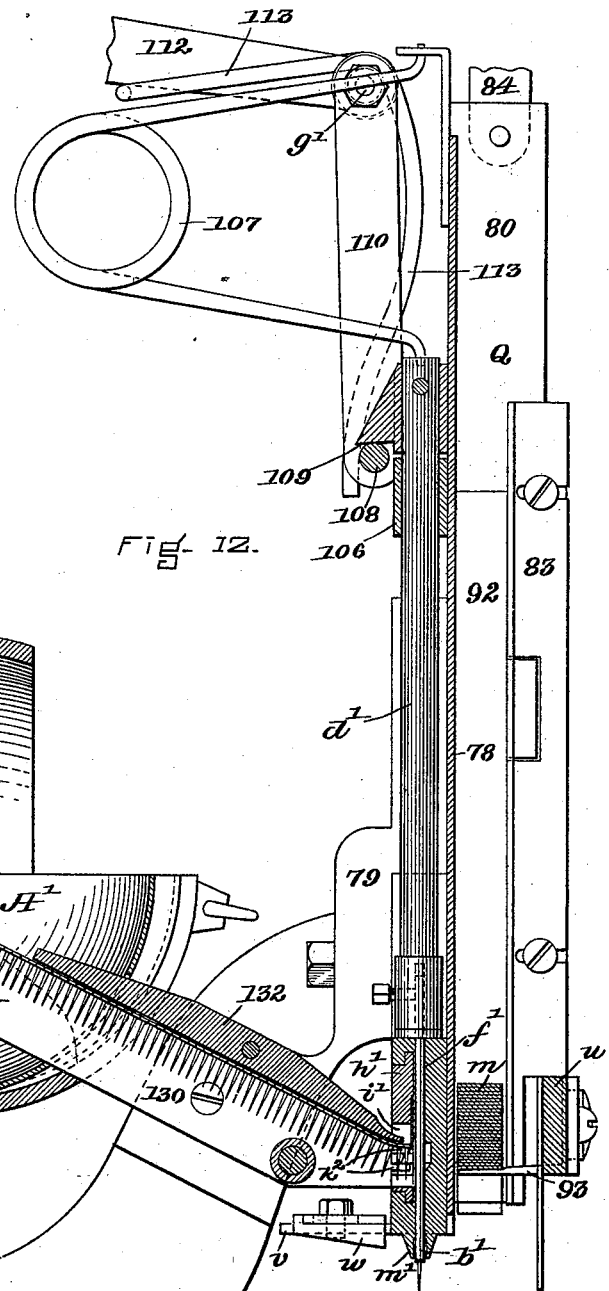
WITNESSES.
INVENTOR-
John Hyslop.
by Teschemacher
Atty.

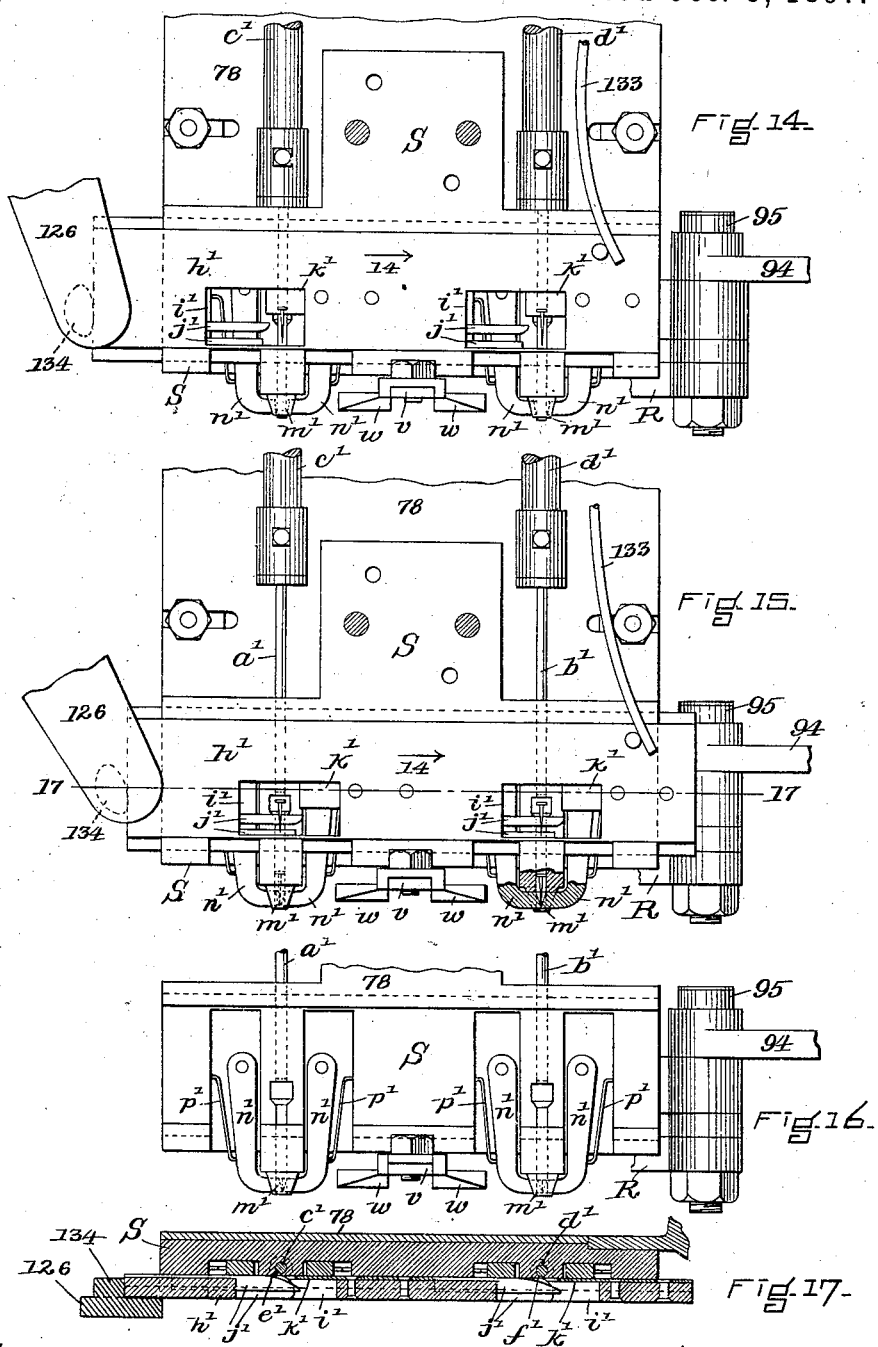

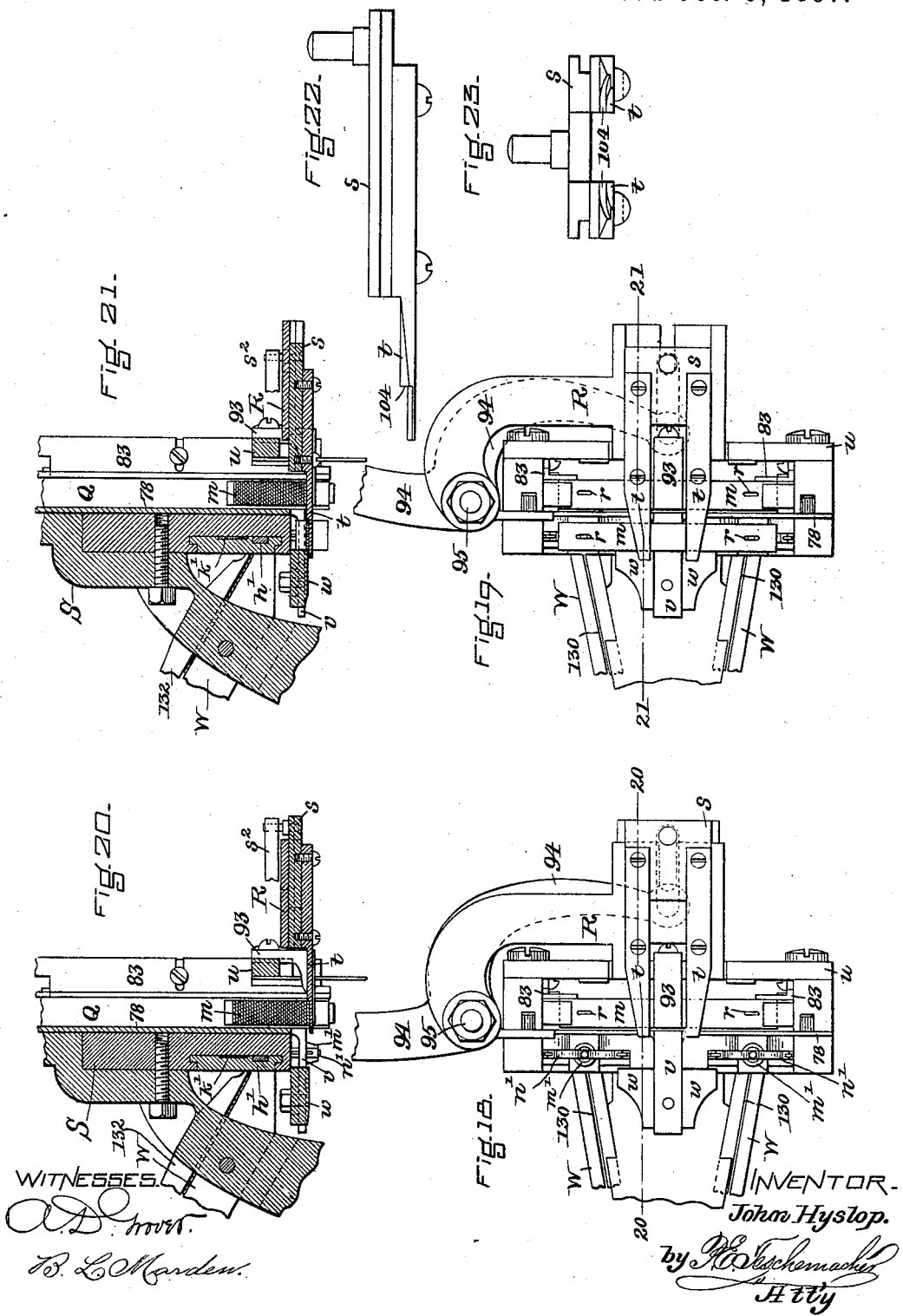

(No Model.) 14 Sheets—Sheet 13.
J. HYSLOP.
MACHINE FOR MAKING LEATHER BOARD BOOT OR SHOE SHANKS, &c.
No. 591,353. Patented Oct. 5, 1897.
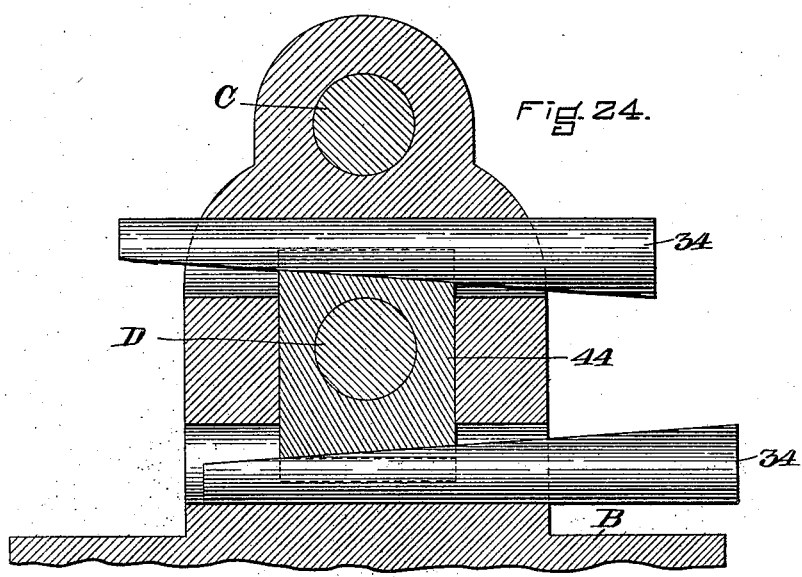
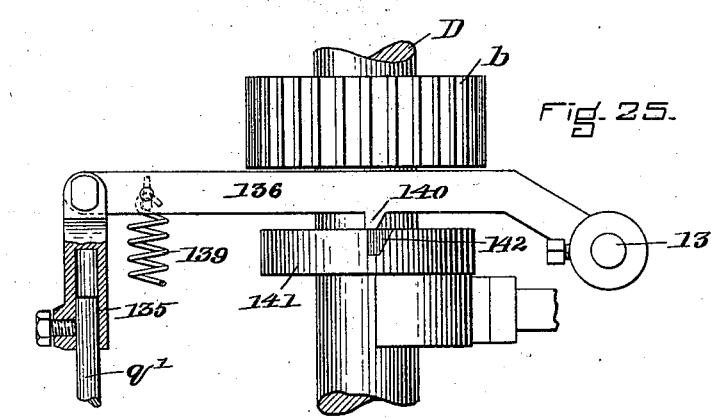
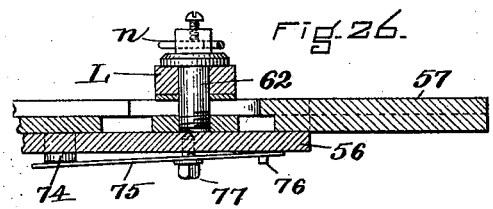 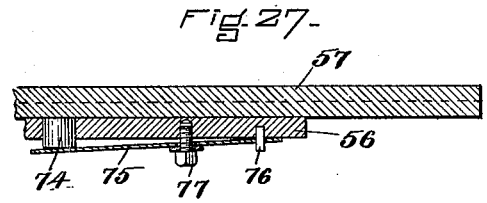
WITNESSES.
A. D. Trott.
B. L. Marden.
INVENTOR—
John Hyslop.
by P. E. Taschemacher
Att'y (No Model.) 14 Sheets—Sheet 14.
J. HYSLOP.
MACHINE FOR MAKING LEATHER BOARD BOOT OR SHOE SHANKS, &c.
No. 591,353. Patented Oct. 5, 1897.
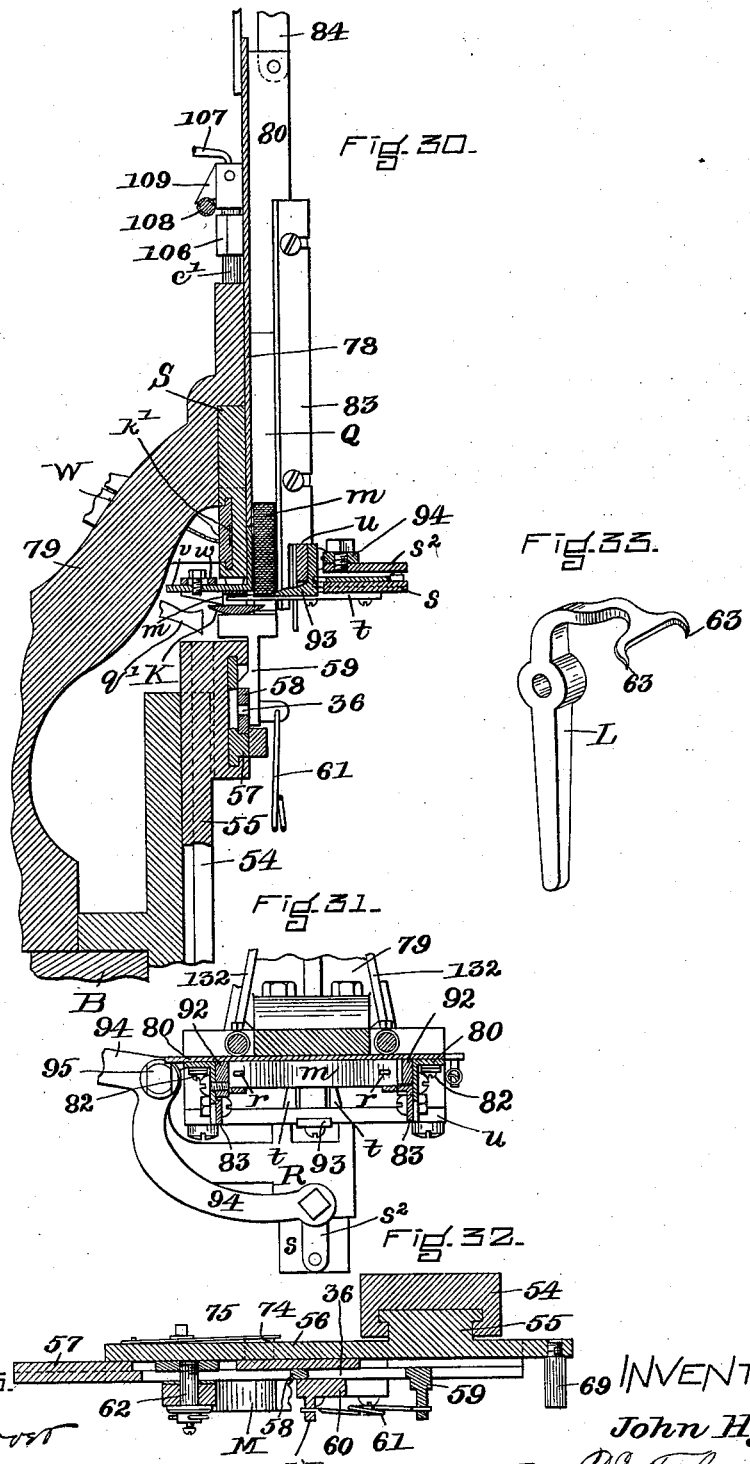
WITNESSES.
INVENTOR.
John Hyslop.

United States Patent Office.

JOHN HYSLOP, OF ABINGTON, MASSACHUSETTS, ASSIGNOR OF ONE-HALF TO JOSEPH PETTEE, JR., OF WHITMAN, MASSACHUSETTS.

MACHINE FOR MAKING LEATHER-BOARD BOOT OR SHOE SHANKS, &c.

SPECIFICATION forming part of Letters Patent No. 591,353, dated October 5, 1897.

Application filed February 26, 1897. Serial No. 625,207. (No model.)

*To all whom it may concern:*

Be it known that I, JOHN HYSLOP, a citizen of the United States, residing at Abington, in the county of Plymouth and State of Massachusetts, have invented a Machine for Making Leather-Board Boot or Shoe Shanks and Attaching Metallic Stiffeners to the Same, of which the following is a full, clear, and exact description, reference being had to the accompanying drawings, making part of this specification, in which—

Figure 1:
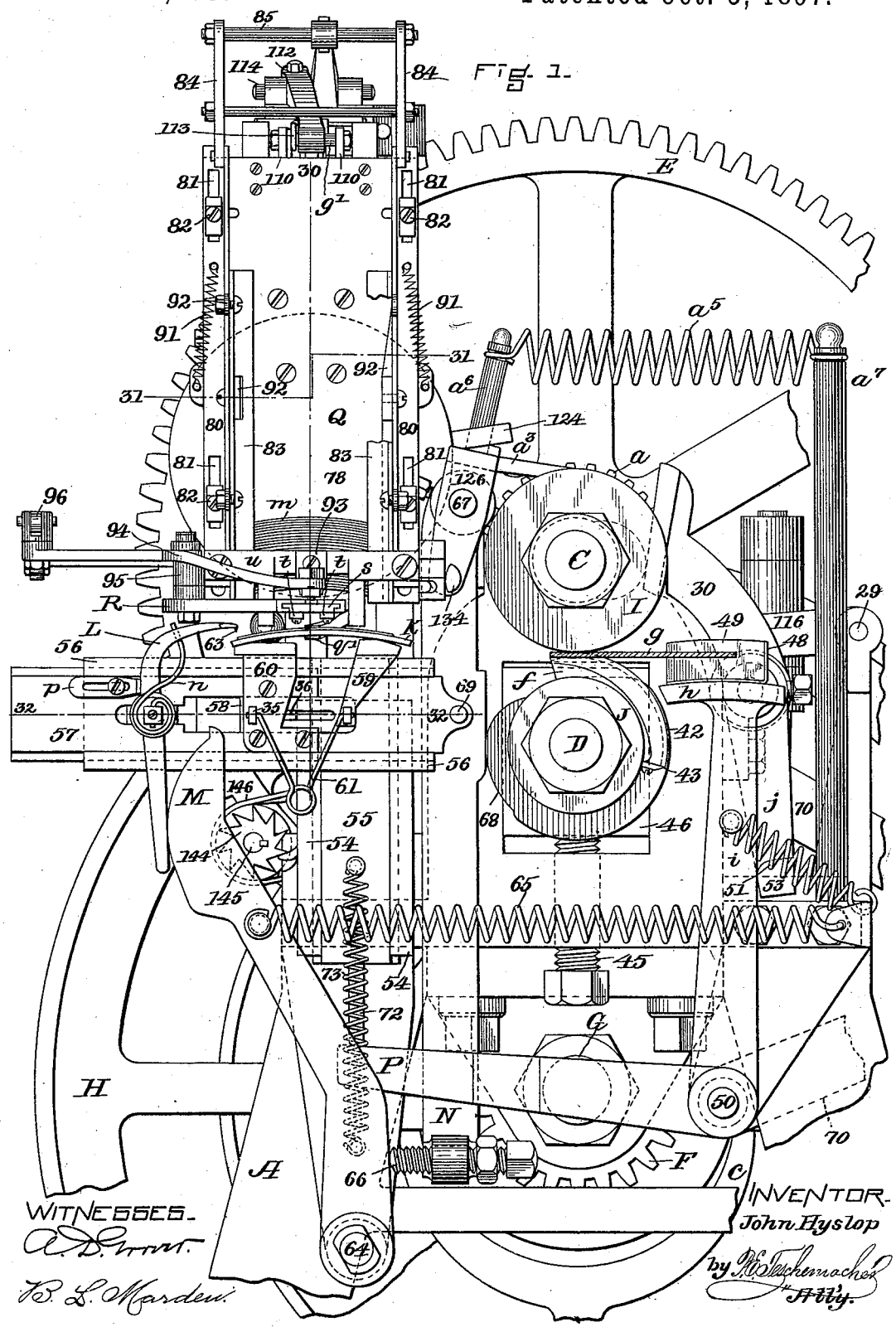
Figure 2:
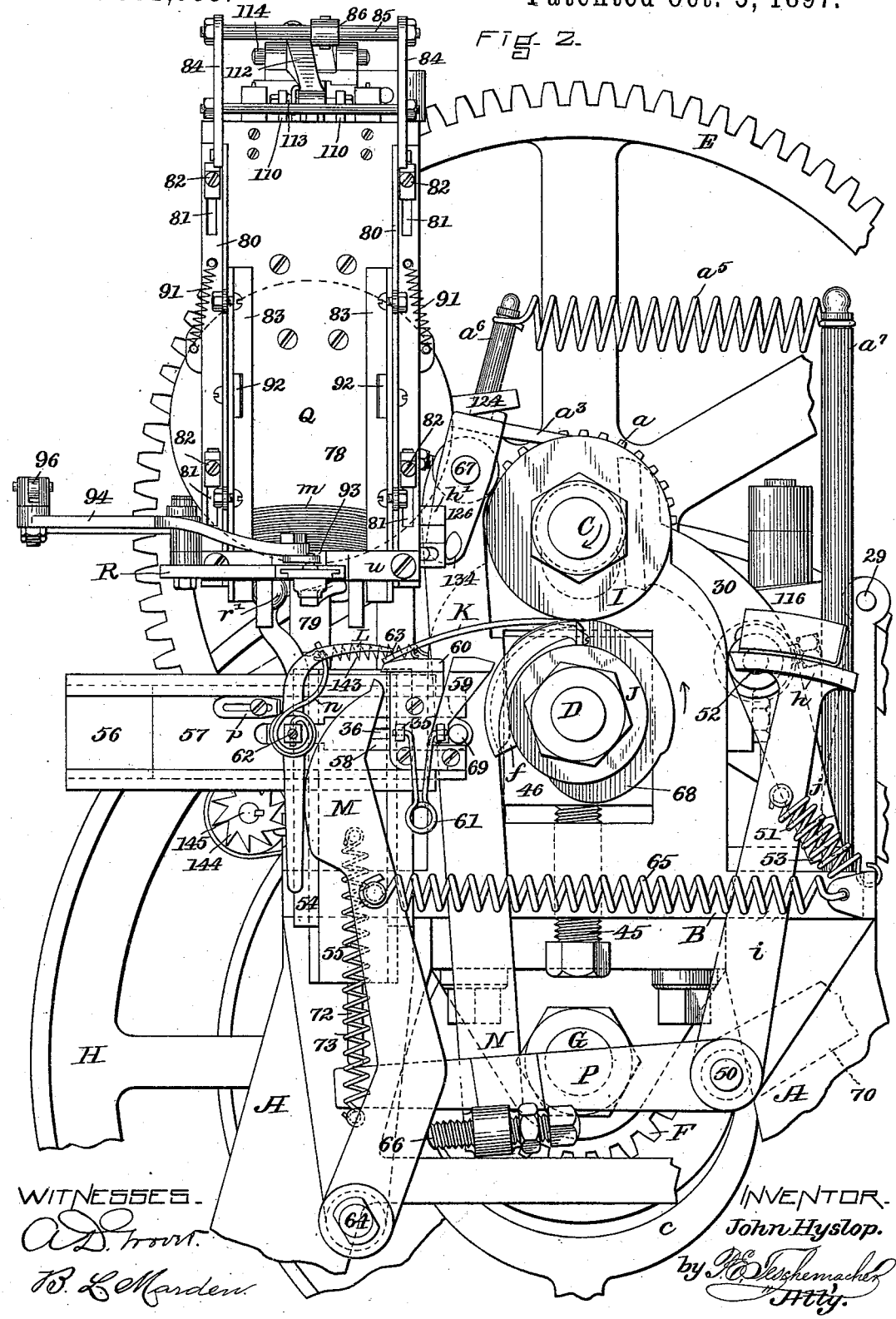

Figure 1 is a front elevation of my improved machine. Fig. 2 is a similar elevation with the parts in a different position. Fig. 3 is a side elevation of the machine. Fig. 4 is a plan of the machine, a portion of the main shaft at the right-hand side, together with the driving-gear and pulleys thereon, being omitted. Fig. 5 is a longitudinal vertical section on the line 5 5 of Fig. 4, looking in the direction of the arrow 5. Fig. 6 is a transverse vertical section on the line 6 6 of Fig. 4, looking in the direction of the arrow 6. Fig. 7 is a transverse vertical section on the line 7 7 of Fig. 4, looking in the direction of the arrow 7. Fig. 8 is an enlarged horizontal section on the line 8 8 of Fig. 3. Fig. 9 is an enlarged plan of the feeding-roll which carries the die for cutting and shaping the leather-board shoe-shanks. Fig. 10 is a vertical section on the line 10 10 of Fig. 9. Fig. 11 is a vertical section on the line 11 11 of Fig. 9. Fig. 12 is a vertical section on the line 12 12 of Fig. 8. Fig. 13 is a sectional detail similar to Fig. 12 with the parts in a different position. Figs. 14, 15, and 16 are rear elevations of the tack separating and driving mechanism, showing the tacks and tack-drivers in different positions. Fig. 17 is a section on line 17 17 of Fig. 15. Figs. 18 and 19 are inverted plans of the metallic-stiffener feed mechanism with the parts in different positions. Fig. 20 is a vertical section on line 20 20 of Fig. 18. Fig. 21 is a vertical section on line 21 21 of Fig. 19. Fig. 22 is a side elevation of the stiffener feed-fingers and the slide to which they are attached. Fig. 23 is an end view of the same. Fig. 24 is a vertical section on line 24 24 of Fig. 4. Fig. 25 is a detail plan of a portion of the mechanism for operating the shank-ejector. Fig. 26 is a horizontal section on line 26 26 of Fig. 7. Fig. 27 is a horizontal section on line 27 27 of Fig. 7. Fig. 28 is a perspective view of a leather-board shoe-shank having a metallic stiffener attached thereto by my machine. Fig. 29 is a vertical section on line 29 29 of Fig. 28. Fig. 30 is a vertical section on line 30 30 of Fig. 1 with the parts in a different position. Fig. 31 is a horizontal section on line 31 31 of Fig. 1. Fig. 32 is a horizontal section on line 32 32 of Fig. 1. Fig. 33 is a perspective view of the gripper-finger by means of which the shank is held down upon the anvils.

My invention relates to a machine in which a shoe-shank, of leather-board or other suitable material, is cut from a sheet or strip and properly shaped and longitudinally curved and a metallic stiffener afterward attached thereto, all at a single operation of the machine, whereby a material saving in time and labor is effected and perfect work insured.

To this end my invention consists in a machine of this character embodying certain novel features and combinations of mechanical devices for producing the desired result in a simple, effective, and reliable manner, as will be hereinafter fully described, and specifically pointed out in the claims.

In the said drawings, A represents the framework of the machine, upon which is bolted the bed B, from which rise suitable standards or housings for two shafts C D, arranged one above the other and connected to rotate at the same speed by means of gears $a$ $b$. The shaft C carries a large gear E, which is driven by a smaller gear F, loose on the driving-shaft G and adapted to be connected therewith by a clutch $c$, operated by a foot-lever (not shown) extending out to the front of the machine, the shaft G carrying a balance-wheel H and the usual loose and fast pulleys, the latter being driven by a belt from any suitable source of power.

To the front ends of the shafts C D, which are supported rigidly at a fixed distance apart and project beyond their front bearings, are removably secured a pair of rolls I J, the upper roll I having a plain smooth peripheral surface, while the lower roll J is provided with a cutting and shaping die $f$, secured thereto by screws 40, as shown in Figs. 9 and 11. This die $f$, which extends only part way around the roll, is made concentric therewith, its upper surface being concaved transversely, as shown at 41, Fig. 10, whereby sharp cutting edges 42 43 are formed, the contour of which corresponds to the shape of the sides and one end of the shoe-shank K, Fig. 28, to be cut, these cutting edges coming into unyielding contact with the smooth surface of the upper roll I and thereby cutting a shank K from a strip $g$, Figs. 1, 3, 4, and 5, of leather-board or other suitable material as it passes between said rolls. As the leather-board strip $g$ is drawn between the feed-rolls I J the shank is pressed as fast as it is cut into the concavity 41 between the cutting edges of the die $f$, thereby giving the contiguous surface of the shank the required convex form in cross-section, while the shank is also curved in the direction of its length as required to conform to the curvature of the shoe in which it is to be placed.

To take up the wear of the cutting edges 42 of the die $f$ and insure at all times a perfect and uniform contact of the same with the upper roll I, so that the die may cut through the leather-board at all points, the lower shaft D is made vertically adjustable toward and from the shaft C. This adjustment is effected by means of two wedges 34, tapered in opposite directions, as shown in Figs. 5 and 24, and placed above and below the rear journal-box 44 of the shaft D, and a vertical screw 45, turning in the bed-plate and bearing on the under surface of the front journal-box 46 of the said shaft, which can thus be adjusted to and from the shaft C and kept in perfect parallelism therewith.

$h$ is a rocking feeding-rest mounted upon an upright rocker-arm $i$ and provided with front and side gages 48 49, which may be made adjustable, if desired. The strip $g$ of leather-board is placed on this rest against its gages, and as the rest is swung forward on its pivot 50 the strip $g$ is advanced sufficiently to enable its front edge to be properly seized by the rolls I J, by which it is carried forward, as previously explained, after which the rest swings back to its normal position ready to again carry forward the strip for the next shank. The rocker-arm $i$ is carried forward against the resistance of a retracting-spring 51 by means of a lever $j$, secured to a horizontal shaft 52, provided at its opposite end with an arm 30, actuated by a cam $k$ on the shaft C, a toe or projection 53 at the lower end of the lever $j$ resting against the arm $i$, and by this device the strip $g$ is caused to be seized by the rolls, so that the delivery of the shank thereby will be properly timed with relation to the stiffener-attaching mechanism, to be presently described.

I will now describe the mechanism by means of which a metallic spring-stiffener $m$, Figs. 28 and 29, is attached to the upper surface of the leather-board shank K after it is passed between the rolls I J, said mechanism not being used if it should not be desired to provide the shank with a metallic stiffener, in which case the shank would be removed from the machine immediately after being cut and shaped by the said rolls. Within a vertical dovetailed groove in a piece 54, secured to the front of the bed-plate, is fitted a slide 55, the upper end of which consists of a horizontal plate 56, formed integral therewith and having a horizontal dovetailed groove in which is fitted a slide 57, these two slides and the parts connected therewith forming a carrier for the shoe-shank. In a horizontal grooved way in the slide 57 is fitted another slide 58, to the right-hand end of which is secured an anvil 59. On the left of the anvil 59 is another anvil 60, which is secured to the slide 57, these two anvils being normally kept apart, as shown in Fig. 1, by means of a V-shaped wire spring 61, the upper bent ends of the two branches or members of which enter holes in projections on said anvils. These two anvils when brought into the position shown in Fig. 2, by mechanism to be presently described, serve to receive the shank after it has passed between the feed-rolls and carry it forward into a position to subsequently receive the metallic stiffener $m$, which is secured thereto by tacks, as shown in Figs. 28 and 29, clenched upon said anvils. To the slide 57 on a pin 62 is pivoted near its center a gripper-finger L, Figs. 1, 2, and 33, having two sharp spurs 63, which, when the finger is brought down, as shown in Fig. 2, against the resistance of a spring $n$, are pressed into the extreme end of the shoe-shank after it has been carried by the feed-rolls I J over the two anvils, as shown in Fig. 2, a horizontally-adjustable stop $p$, projecting from the slide 57, serving to limit the backward movement of the gripper-finger when released and thrown up by its spring $n$. The slide 57 together with the anvils are moved horizontally from the position shown in Fig. 1 to that shown in Fig. 2, ready to receive the shank, by a lever M, fulcrumed at 64 and actuated in one direction by a spring 65 and in the opposite direction by a screw 66 at the lower end of a lever N, which is fulcrumed at 67 and is actuated by a cam 68 on the shaft D. As the lever M is moved to the right by the spring 65 its upper end is brought into contact with the anvil 60, which, together with the slides 57 58 and anvil 59, secured to latter, are moved toward the feed-rolls I J until the lower end of the anvil 59 strikes a stop-pin 69 on the piece 56, and as the slide 57 continues to move in the same direction the anvil 60, secured thereto, is moved up into contact with the anvil 59 against the resistance of the spring 61, the slide 57 moving on the smaller slide 58, which is held stationary by the contact of the anvil 59 with the pin 69, this movement compressing or closing together the spring 61, as shown in Fig. 2.

As soon as the shoe-shank has been carried over the anvils by the feed-rolls into the position shown in Fig. 2 the lever M commences to move to the left, when it will by its pressure against the lower arm of the gripper-finger L rock the latter on its pivot and cause its spurs to enter the edge of the shank, as shown, thereby gripping it and holding it tightly against the edge of the anvil 60, so that it cannot move out of its proper position, and as the lever M continues to move to the left it forces the finger, and with it the slide 57, to which it is pivoted, and the parts connected with said slide, backward into the position shown in Fig. 1, the spring 61 separating the anvils as the lever M moves to the left after having caused the gripper-finger L to seize the edge of the shank, as shown in Fig. 2, so that the opposite ends of the shank will be properly supported by said anvils at the points where the tacks which are employed to secure the stiffener thereto are to be driven and clenched. As the slide 57 and anvil 60, secured thereto, are moved to the left by the lever M the spring 61, by its pressure against the anvil 59, causes the smaller slide 58 to move outward from the slide 57 until arrested by a stop-pin 35, fitting within a slot 36 in said slide 58, as shown in Figs. 1 and 32. The above-described backward movement of the slide 57 carries the shoe-shank horizontally into a position under the two tack-drivers, to be hereinafter described, after which the vertical slide 55 and all the parts connected therewith are raised to carry the shank vertically upward close to the nozzles of the tack-driving device, to be hereinafter described, and into a position to receive the metallic stiffener, which is then centrally placed upon the upper surface of the shank by mechanism which will be presently described. The upward movement of the slide 55 is effected by a lever P, secured to the front end of a rock-shaft 50, to the opposite end of which is secured an arm or lever 70, which is actuated by a cam 71 on the shaft D, the lever P bearing on a vertical pin 72, projecting from the bottom of the slide 55, which is drawn down by a spring 73 when released by the downward movement of the lever P, one end of the spring 73 being attached to the slide 55 and the opposite end to a pin projecting from the framework. The downward movement of the slide 55 takes place just before the anvils are moved from the position shown in Fig. 1 to that shown in Fig. 2, in order that said anvils may be lowered to a proper level to receive the shank as it comes from the feed-rolls.

To prevent the slide 57 from being carried backward over the feed-rolls beyond the exact limit required by its momentum when impelled by the lever M, and also to obtain sufficient resistance to insure the proper pressure of the gripper-lever L upon the end of the shoe-shank, so that the latter will be held firmly down upon the edge of the anvil 60, I provide a friction device between the slide 57 and the plate 56, in which it moves. This device consists of a pin 74, fitting within a hole in the plate 56, Figs. 26 and 27, and pressed inward against the slide 57 by a flat spring 75, the opposite end of which is held in place by a pin 76, the pressure of the spring upon the pin 74 being regulated by a screw 77 to produce more or less friction on the slide 57, as required.

I will now describe the mechanism for placing the metallic stiffener upon the shoe-shank K in a position to be secured thereto, as shown in Figs. 28 and 29.

Q is a vertically-arranged rack or magazine for containing a quantity of metallic stiffeners m, which are piled one upon the other, as shown particularly in Figs. 1, 2, 20, 21, and 30, this rack consisting of a vertically-arranged back plate 78, secured to a support 79, rising from the bed-plate of the machine, and provided with vertical angular strips or side pieces 80, provided with slots 81, through which pass fastening-screws 82, whereby said side pieces 80 are enabled to slide up and down on the plate 78. The lower ends of the side pieces 80 are turned inward at a right angle to support the ends of the lowermost stiffener which rests thereupon, the pile of stiffeners being thus prevented from dropping out of the rack. To the sliding strips 80 are secured other angular strips 83, which form front pieces to hold the pile of stiffeners from falling out of the rack. To the top of each of the side pieces 80 is pivoted a link 84, the two links being connected at the top by a horizontal rod 85, to which is pivoted a lever 86, fulcrumed on an arm projecting horizontally from the top of a post 87, rising from the bed-plate, the opposite end of said lever 86 being connected to a vertical rod 88, secured at its opposite end to a lever 89, which is pivoted at 29, and is actuated by a cam 90, Figs. 4 and 7, on the shaft C, to raise the sides of the rack against the resistance of springs 91, and thus lift the pile of stiffeners therein out of the way of the anvils and shoe-shanks thereon as they are moved backward from the position shown in Fig. 2 to that shown in Fig. 1. The springs 91 keep the lever 89 always in contact with the cam 90 and serve to draw down the side pieces 80 of the rack at the proper time, and thereby lower the pile of stiffeners into a position to enable the one at the bottom to be taken from the rack, by mechanism to be hereinafter described, and placed upon the shoe-shank after the latter has been raised by the anvils to the proper level to receive it. On each side of the rack against the side pieces 80 is removably secured a supplementary strip or bar 92, tapered at its upper end, as shown in Fig. 1, these pieces being changed for others of different thicknesses when stiffeners of different length are employed, so that the stiffeners may fit closely within the rack and be prevented from moving therein in the direction of their length, whereby they are properly centered, so that their slots r, Figs. 28 and 29, will be in a proper position with respect to the nosepieces or nozzles of the tack-driving mechanism, to be hereinafter described.

R is a stationary plate which is bolted to an arm projecting from one side of the bottom of the back plate 78 of the rack Q. This plate is provided with a dovetailed groove in which is fitted a slide s, which carries two fingers t t, Figs. 18, 19, 20, 21, 22, and 23, which extend under the bottom of the rack, as shown.

u is a cross-bar extending across the front of the rack Q, near its bottom, and attached to and moving vertically with the side pieces 80 of the same. To this bar u is secured an angular plate 93, the lower horizontal portion of which extends under the lowermost stiffener in the rack and serves to support the same at the center. To the finger-carrying slide s is connected, by means of a link $s^2$, Figs. 3, 20, and 21, one end of a bent lever 94, fulcrumed at 95 on the plate R and having pivoted to its opposite end a rod 96, which is screwed into the end of a tubular connecting-piece 97, Fig. 4, within the opposite end of which fits a rod 98, held in place by a transverse pin 99, arranged to slide in slots in said tube 97, as shown in Fig. 3, a spring 100 (shown dotted in Fig. 4) being placed within the tube between the ends of the rods 96 and 98. To the outer end of the rod 98 is pivoted a lever 101, fulcrumed at 102 on an arm 39, extending out horizontally from the post 87, and carrying at its opposite end a cam-roll which engages a cam-groove in a cam-wheel 103, Fig. 4, on the shaft C, and thus, through the connections described, the slide s, with its fingers t t, is moved in and out, as required, and in case of any obstruction which might interfere with the movement of the slide the spring 100 will yield and permit the rod 98 to slide within the tube 97, thus avoiding any breakage or injury to the parts, which might occur if a rigid connection was employed, the spring 100 being sufficiently stiff to prevent it from yielding under the ordinary movements of the parts. Each of the fingers t t is provided near its inner end on the upper side with a shoulder 104, Figs. 22 and 23, said shoulders when the fingers are moved inward engaging the front edge of the lowermost stiffener in the rack Q and carrying or pushing it out horizontally from its position under the pile (shown in Figs. 10 and 20) to the position shown at the left-hand side of Figs. 19, 21, and 30, with its center lying directly under and in contact with a narrow plate v, which is provided at its outer end with an adjustable gage w, which limits the backward movement of the stiffener and causes it to be exactly centered with respect to the shoe-shank. The stiffener is thus slid over the upper surface of the shank, supported beneath the same on the anvils 59 and 60, as shown in Fig. 30, the two slots r r of the stiffener being then directly beneath the tack-drivers ready to receive the tacks by which the stiffener is fastened to the shank. After the stiffener has been pushed under the tack-drivers the shoe-shank is lifted by the anvils into contact with the extreme ends of the stiffener, exerting a slight upward pressure on the same, and as the center of the longitudinally-curved stiffener is in contact with the plate v it follows that the ends of the stiffener will be pressed against the shank with sufficient force to cause said stiffener to be held firmly in place on the shank by the friction thus created, which enables the fingers t t to be withdrawn from under the stiffener without disturbing or moving it in the slightest degree from its central position, this being a very important consideration, as otherwise the slots r of the stiffener might be moved by the withdrawal of the fingers t t out of register with the tack-drivers.

I will now briefly describe the mechanism for driving the tacks by which the stiffeners are secured to the shoe-shank and the mechanism for supplying the tacks to the points where they are to be driven. This mechanism is similar in construction to that shown and described in United States Letters Patent No. 467,104, granted to me January 12, 1892, and No. 543,135, issued to me July 23, 1895, and forms no part of my present invention, except in its relation to the mechanism previously described, by which the shank and stiffener are brought to their relative positions to receive the tacks.

$a'$ $b'$ are the tack-drivers, which are secured to the lower ends of two vertical plunger-bars $c'$ $d'$, which move in guides 106, attached to the rear side of the plate 78 of the stiffener-rack Q, these tack-drivers sliding in vertical tack-channels $e'$ $f'$, Figs. 12, 13, and 17, formed in a piece S, extending across the rear side of the bottom of the rack Q. Each of the plunger-bars is thrown down to drive a tack by a stiff wire spring 107, against the resistance of which it is lifted by a transverse rod 108, which fits under a projection 109, Figs. 3 and 12, said rod extending between and passing through the lower ends of two links 110, which are connected at their upper ends by a cross-rod $g'$, to which is pivoted a lever 112, fulcrumed at 114, Fig. 3, to the opposite end of which is pivoted a rod 115, the lower end of which is pivoted to a lever 116, fulcrumed at 29, Fig. 7, on a standard rising from the bed-plate B and operated by a cam 118 on the shaft C, said cam thus serving to simultaneously lift the two plunger-bars $c'$ $d'$, with their tack-drivers, against the resistance of the springs 107, which throw said bars down as soon as the cam 118 passes out of contact with the lever 116. The ends of the cross-rod 108 are kept in place beneath the projections 109 of the plunger-bars by means of a wire spring 113, bearing against the same, the upper end of said spring being hooked under the lever 112.

T is a rotary tack magazine or reservoir which is adapted to contain a supply of tacks and is supported by and rotated upon a stud 120, Fig. 12, projecting from the arm or bracket 79, rising from the bed-plate. The magazine T is provided on one side with a ratchet-wheel 122, Fig. 7, with which engages a pawl 123 on a lever 124, which is actuated against the resistance of a spring 125 by a bail-shaped rocker-lever 126, pivoted to a suitable support $a^2$, and provided with an arm $a^3$, which is acted upon by a cam $a^4$ on the shaft C to move the lever 126 against the resistance of a spring $a^5$, fastened to the upper end of a rod $a^6$, projecting up from the rocker-lever 126, said spring being secured at its opposite end to a post $a^7$, rising from the bed-plate, as shown in Figs. 1, 2, and 7. Within the magazine T, around its inner periphery, are arranged a series of buckets 129, which lift or pick up the tacks in small quantities as the magazine revolves and drop them onto two diverging raceways W W, which extend from the interior of the magazine, through apertures in a semicircular apron A', forming a portion of the front of the same, to the tack-channels $c'$ $d'$, as shown in Figs. 8 and 12. The inclined raceways W W are each composed of two parallel bars set at such distance apart as to leave a space 130 between them for the reception of the shanks of the tacks, the heads of which rest upon and are supported by the upper edges of the bars by which they are guided as they slide down to the lower ends thereof. The upper end of each raceway is enlarged and provided with inclined or flaring sides 131, which direct or guide the tacks as they fall thereon into the space 130, those tacks which fall into the right position being caught by the head, with the shank projecting into the space 130, while those that have not entered the said space drop off on either side of the raceway into the apron A', from which they pass back into the magazine T. Each raceway is provided with a cap or cover 132, which is formed and secured in such manner as to leave a space between it and the two parallel bars beneath, as shown in Fig. 12, to permit of the free passage of the heads of the tacks as they slide down the raceway, and at the same time prevent them from being misplaced or thrown out by the jar or concussion to which they may be subjected.

The tacks are taken one by one from the lower or delivery end of each raceway and transferred to positions in the tack-channels $c'$ $d'$ beneath the tack-drivers in the following manner: Within a guideway in the piece S which contains the said tack-channels is fitted a horizontally-reciprocating slide $h'$, having two rectangular openings $i'$ $i'$, Figs. 12, 14, 15, 16, and 17, into which are fitted the lower ends of the two raceways, said openings being of sufficient length to permit of the movement of the slide across the ends of the raceways.

To the slide $h'$ at the left-hand side of each opening are secured two picker-teeth $j'$ $j'$, which coöperate with a thin plate $k'$ on the inner opposite side of the opening $i'$ and cause the tack to pass into the tack-channel as the slide $h'$ is pushed forward in the direction of the arrow 14 against the resistance of a spring 133, Figs. 3 and 14, this forward movement of the slide being effected by the movement of the lever 126, which is provided at its lower end with a projection 134, bearing against the end of the slide $h'$, as shown in Fig. 2.

At the lower end of each raceway are formed two pairs of projections $k^2$, the upper pair embracing the lowermost tack under the head and the lower pair embracing it near the point, by which means the tack is held in a vertical position ready to pass into the tack-channel. When the parts are in their normal position, the picker-teeth extend across the bottom of the raceway, as shown in Figs. 15 and 17, and serve to hold back the entire line of tacks therein. On the forward movement of the slide $h'$ the wedge-shaped picker-teeth pass between the two lower tacks in the raceway, thus supporting them and acting as a stop to hold back the entire line of tacks above the lowest one at the same time that the beveled sides of the picker-teeth push the tack which is held between the projections $k^2$ into the tack-channel through the opening $i'$ at the side thereof. The slide $h'$ is returned to its original position by the spring 133, ready to operate on the next tack in the same manner, the movement of the slide and pickers being so timed as to cause the tacks to be forced into the tack-channels at the proper moment to be acted upon by the tack-drivers $a'$ $b'$, which then descend and drive the two tacks through the tapering nozzles $m'$ $m'$, located at the lower ends of the tack-channels, said nozzles lying directly over the slots $r\, r$ of the metallic stiffener $m$, held upon the shoe-shank, as previously described.

On opposite sides of each of the nozzles $m'$ are arranged a pair of spring-actuated levers $n'$ $n'$, the lower inwardly-bent ends of which enter opposite sides of an open vertical slot formed at the bottom of each nozzle, the lower bent ends of said levers, which lie in contact with each other, forming jaws, as shown in Fig. 15, which are each beveled, forming a tack-centering recess, which catches the point of the tack as it drops into the nozzle, thus holding it properly centered over the slot $r$ of the stiffener and with its point directly under its head a moment before the descent of the tack-driver, which forces the tack down through the jaws, by separating the lower ends of the levers $n'$ $n'$, against the resistance of their springs $p'$, Fig. 16, the tacks being thus driven perfectly straight through the slots of the stiffener and through the leather-board shoe-shank, upon the bottom of which they are clenched by contact with the two anvils 59 and 60, by which the shank is supported. As soon as the tacks have been driven the anvils 59 60, together with the shank and stiffener attached thereto, are lowered slightly until said anvils are just below the level of the ejector $q'$, which is then thrown forward with a sudden movement, striking the shank and throwing it out of the machine, after which the anvils are still farther lowered by their carrier-slide and moved toward the feed-rolls I J to receive a new shank, as shown in Fig. 2. The first slight downward movement of the anvils 59 60, which brings the shank into line with the ejector $q'$, is produced by a step or notch 34 on the cam 71, (shown in Fig. 6,) which controls the movement of the lever 70 connected with the lever P, Figs. 1 and 2, on which bears the pin 72, projecting from the bottom of the slide 55 of the anvil-carrier. As the anvils descend to bring the shank into line with the ejector the lever M commences to move toward the feed-rolls, thus releasing the gripper-finger L, the upper curved arm of which is then raised by its spring $n$, as shown in Fig. 1, to disengage its spurs from the edge of the shoe-shank, which is then free to be thrown out by the ejector, as previously described.

The ejector $q'$ consists of a rod suitably shaped at its outer end, as shown in Figs. 3 and 30, and adjustably secured to a connecting-piece 135, Figs. 3 and 25, which is pivoted to a lever 136, fulcrumed at 137 upon a suitable support, said lever being shot forward to cause the ejector $q'$ to throw out the shank by a spring 139, which holds a tooth or projection 140 on said lever against the side of a cam-wheel 141 on the shaft D until a notch 142 on said wheel is brought into a position opposite said projection 140, which then drops therein, allowing the spring 139 to act and shoot forward the ejector, immediately after which the inclined side of the cam-notch 142 acts upon the correspondingly-inclined side of the projection 140, thus instantly drawing back the ejector to its former position ready to again act at the proper time, the projection 140 then remaining in contact with the side of the wheel 141 until the notch 142 is again brought into line therewith.

$r'$ is a hammer, the arm or lever of which is pivoted to the framework and is actuated against the resistance of a spring 143 by a ratchet-wheel 144 on a shaft 145, carrying a pulley, over which passes a crossed belt 146, passing over and receiving motion from the shaft D, as shown in Fig. 7, said hammer when released being thrown by its spring against the bracket 79, which supports the tack-raceways W W, the jar or concussion thus produced keeping the tacks in motion down the raceways, as required.

By providing the curved-spring metallic stiffener $m$ with longitudinal slots $r$ $r$ for the passage of the attaching-tacks, instead of immovably securing the ends of the stiffener to the shank by rivets or tacks passing through round holes in the same, as heretofore, the passage of the tacks is rendered more certain and a free longitudinal movement of the stiffener upon the shank within the limits of the slots is secured, which renders the shank much more elastic when placed within the shoe, an advantage which will be readily appreciated by the wearer.

What I claim as my invention, and desire to secure by Letters Patent, is—

1. In a machine for making shoe-shanks, a shank-cutter consisting of a roll mounted on a shaft and provided with cutting edges corresponding in shape to that of the sides of the shank to be cut, the surface of the roll between the cutting edges being of concave form, whereby the shank as it is forced against said surface is made of convex form in cross-section, substantially as described.

2. In a machine for making shoe-shanks, a combined shank cutter and former, comprising a roll provided with cutting edges for cutting the sides of the shank and a concave die occupying the space between said cutting edges for giving the shank a convex form in cross-section while being cut, said cutting edges and die being formed in a single piece, substantially as described.

3. In a machine for making shoe-shanks, the combination with a smooth-faced roll mounted on the end of a shaft, of a coöperating roll also mounted on the end of a shaft parallel therewith and provided with a die having cutting edges for cutting the sides of the shank and a concave surface occupying the space between said cutting edges, whereby the shank as it passes between said rolls is simultaneously cut, given a convex form in cross-section and curved in the direction of its length, substantially as described.

4. In a machine for making shoe-shanks, the combination with a pair of coöperating rolls mounted on the ends of parallel shafts, one of said rolls having a smooth face and the other provided with means for cutting and shaping the shank as it passes between said rolls, of a reciprocating feed-rest for positively feeding the strip of material from which the shanks are to be cut, to the rolls, the forward movement of said rest being properly timed to bring the edge of the strip of material into a position to be caught by the end of the cutting and shaping device, substantially as described.

5. In a machine for making shoe-shanks and attaching metallic stiffeners thereto, the combination with a pair of feed-rolls provided with means for simultaneously cutting and shaping the shoe-shank, of tack-driving mechanism for driving the tacks for securing the metallic stiffener to the shank, a reciprocating carrier for taking the shank after it leaves the feed-rolls and placing it in a position beneath the tack-drivers and means for placing a metallic stiffener on the shank after the latter has been placed beneath the tack-drivers, substantially as described.

6. In a machine for making shoe-shanks and attaching metallic stiffeners thereto, the combination with the shank cutting, forming and feeding device, of tack-driving mechanism for driving the tacks for securing the metallic stiffener to the shoe-shank, means for taking the shank as it leaves the cutting, forming and feeding device and placing it in position beneath the tack-driving mechanism, a rack or container for holding a supply of metallic stiffeners and means for taking a single stiffener from the rack and placing it on the shank under the tack-drivers, substantially as described.

7. In a machine for making shoe-shanks and attaching metallic stiffeners thereto, the combination with the shank cutting, forming and feeding device, of tack-driving mechanism for driving the tacks for securing the metallic stiffener to the shoe-shank, means for taking the shank as it leaves the cutting, forming and feeding device and placing it in position beneath the tack-driving mechanism, a rack or container for holding a supply of metallic stiffeners, means for taking a single stiffener from the rack and placing it on the shank under the tack-drivers and an ejector for discharging the shank from the machine after the stiffener has been attached thereto, substantially as described.

8. In a machine for making shoe-shanks and attaching metallic stiffeners thereto, the combination with the shank cutting, forming and feeding device, of a rack for holding a supply of stiffeners, tack-driving mechanism comprising two tack-drivers and means for supplying tacks to the same, a carrier for taking the shank as it leaves the cutting, forming and feeding device and placing it in a position beneath the tack-drivers, means for taking a single stiffener from the rack and placing it in position on the shank with its holes beneath the nozzles of the tack-driving mechanism and means for simultaneously operating the two tack-drivers to drive two tacks through the opposite ends of the stiffener into the shank and clenching the same on its under side, substantially as described.

9. In a machine for making shoe-shanks and attaching metallic stiffeners thereto, the combination with a pair of feed-rolls provided with means for simultaneously cutting and shaping the shoe-shank as it passes between them, of tack-driving mechanism comprising two tack-drivers and means for operating the same, two raceways for supplying tacks to the tack-drivers, a carrier for taking the shank as it leaves the feeding, cutting and shaping rolls and placing it in position beneath the tack-drivers, a rack for containing a supply of metallic stiffeners and means for taking a single stiffener from the rack and placing it on the shank under the tack-drivers, substantially as described.

10. In a machine for making shoe-shanks and attaching metallic stiffeners thereto, the combination with a pair of feed-rolls, one of said rolls having a smooth face and the other provided with means for cutting and shaping the shank as it passes between said rolls, of tack-driving mechanism comprising two tack-drivers and means for operating the same, a rotary tack magazine or reservoir and means for operating the same, two raceways leading from said magazine directly into the channels in which the tack-drivers operate, a carrier for taking the shank as it leaves the feeding, cutting and shaping rolls and placing it in a position beneath the tack-drivers, a rack for containing a supply of metallic stiffeners and means for taking a single stiffener from the rack and placing it on the shank under the tack-drivers, substantially as described.

11. In a machine for making shoe-shanks and attaching metallic stiffeners thereto, the combination of a shank cutting and shaping device, feed mechanism for positively feeding the material to the shank cutting and shaping device at the proper time, tack-driving mechanism, comprising a tack magazine or reservoir, two tack-drivers, two tack-raceways for supplying tacks to the tack-drivers, a carrier provided with a gripper-finger for taking the shank from the feeding device and placing it beneath the tack-drivers, means for taking a single stiffener from the rack and placing it on the shank under the tack-drivers and means for operating said several devices and mechanisms at the proper times with relation to each other, substantially as described.

12. In a machine for making shoe-shanks and attaching metallic stiffeners thereto, the combination of shank cutting, forming and feeding rolls, tack-driving mechanism, comprising two tack-drivers, two raceways and a tack-magazine, a carrier for conveying the shank from the cutting, forming and feeding rolls to a position beneath the tack-drivers, a rack for holding a supply of metallic stiffeners, means for taking a single stiffener from the rack and placing it on the shank under the tack-drivers and a hammer for producing a concussion for keeping the tacks in motion as they pass down the raceways, substantially as described.

13. In a machine for making shoe-shanks and attaching metallic stiffeners thereto, the combination of a shank-cutting mechanism, a rack for containing metallic stiffeners, mechanism for placing a metallic stiffener on the shank and attaching it thereto and a carrier for conveying the shank from the cutting mechanism to the stiffener-attaching mechanism, substantially as described.

14. In a machine for making shoe-shanks and attaching metallic stiffeners thereto, the combination of a shank-cutting mechanism, a shank-forming mechanism, a rack for containing metallic shank-stiffeners, mechanism for placing a metallic stiffener on the shank and attaching it thereto and a carrier for conveying the shank from the cutting mechanism to the stiffener-attaching mechanism, substantially as described.

15. In a machine for making shoe-shanks and attaching metallic stiffeners thereto, the combination of a shank cutting and forming device, feed mechanism for feeding the material to the cutting and forming device, a rack for holding the metallic stiffeners, a shank-stiffener-attaching mechanism, a carrier for conveying the shank from the cutting device to the stiffener-attaching mechanism and a device for taking one shank-stiffener at a time from the bottom of the stiffener-rack and depositing it upon the shank beneath the attaching mechanism, all coöperating substantially as described.

16. In a machine for making shoe-shanks and attaching metallic stiffeners thereto, a shank-carrier, consisting of a vertically-moving slide having a horizontal guideway, a slide reciprocating in said horizontal guideway and provided with a supplementary slide, a pair of anvils secured, one to the main horizontal slide, and the other to the supplementary slide, said anvils being normally separated by a spring and means for actuating the said vertical and horizontal slides to raise and lower the shank supported upon the anvils and carry it from the feeding mechanism to the stiffener-attaching mechanism; substantially as described.

17. In a machine for making shoe-shanks and attaching metallic stiffeners thereto, the combination with the shank-carrier and its anvils, of a gripper-finger pivoted to the main horizontal slide of said carrier and provided with a retracting-spring and a lever for horizontally reciprocating the carrier and actuating the gripper-finger to cause it to hold the shank upon the rear anvil, substantially as described.

18. In a machine for making shoe-shanks and attaching metallic stiffeners thereto, a shank-stiffener rack consisting of a vertical back plate and side pieces sliding vertically on said back plate, said side pieces being provided with front strips and having their lower ends turned inward to form supports for the ends of the stiffeners in the rack and means for vertically reciprocating the side pieces to raise and lower the pile of stiffeners in the rack, substantially as and for the purpose set forth.

19. In a machine for making shoe-shanks and attaching metallic stiffeners thereto, the combination with the stiffener-rack provided with a support 93 adapted to extend under the center of the lowermost stiffener in the rack, of a horizontally-reciprocating slide provided with a pair of fingers $t, t$, arranged one on each side of the support 93 and extending under the bottom of the rack, said fingers each having a shoulder 104 on its upper side for engaging the lowermost stiffener in the rack and pushing it into a position over the center of the shoe-shank and the plate $v$ with its gage $w$ for limiting the backward movement of the stiffener, substantially as described.

20. In a machine for making shoe-shanks and attaching metallic stiffeners thereto, the combination with the stiffener-rack provided with a support 93 adapted to extend under the center of the lowermost stiffener in the rack, of the horizontally-reciprocating slide $s$ provided with a pair of fingers $t, t$, arranged one on each side of the support 93 and extending under the bottom of the rack, said fingers each having a shoulder 104 on its upper side for engaging the lowermost stiffener in the rack and pushing it into a position over the center of the shoe-shank, the plate $v$ with its gage $w$ for limiting the backward movement of the stiffener and the shank-carrier with its anvils, said carrier having a slight upward movement after the stiffener has been placed upon the shank, whereby the ends of the curved-spring shank-stiffener will be tightly pressed against the shank to enable the fingers $t, t$, to be withdrawn from under the stiffener without moving the latter from its central position, substantially as described.

Witness my hand this 20th day of February, A. D. 1897.

JOHN HYSLOP.

In presence of—
P. E. TESCHEMACHER,
B. L. MARDEN.